(12) United States Patent
Horikoshi et al.

(10) Patent No.: US 7,898,196 B2
(45) Date of Patent: Mar. 1, 2011

(54) MOTOR DRIVING APPARATUS FOR DRIVING AND BRAKING BRAKE-EQUIPPED MOTOR

(75) Inventors: Shinichi Horikoshi, Yamanashi (JP); Naoyuki Suzuki, Yamanashi (JP); Tsutomu Shikagawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 583 days.

(21) Appl. No.: 11/872,019

(22) Filed: Oct. 14, 2007

(65) Prior Publication Data

US 2008/0116828 A1 May 22, 2008

(30) Foreign Application Priority Data

Nov. 21, 2006 (JP) .................................. 2006-314703

(51) Int. Cl.
*H02K 17/32* (2006.01)
(52) U.S. Cl. ......... 318/362; 318/273; 318/703; 318/741; 318/757; 388/362
(58) Field of Classification Search .................. 318/703, 318/757, 362, 372, 599, 612, 614, 628, 273, 318/741, 742, 759; 303/89; 388/362
See application file for complete search history.

(56) References Cited

U.S. PATENT DOCUMENTS

| | | | | |
|---|---|---|---|---|
| 4,937,509 A * | 6/1990 | Gundlach | ..................... | 318/362 |
| 4,987,977 A | 1/1991 | Nomura | | |
| 5,090,518 A * | 2/1992 | Schenk et al. | ............... | 188/72.1 |
| 6,425,643 B2 * | 7/2002 | Shirai et al. | .................... | 303/112 |
| 7,052,093 B2 * | 5/2006 | Suzuki et al. | .................... | 303/20 |
| 7,285,927 B2 * | 10/2007 | Kuramochi et al. | .......... | 318/139 |
| 7,301,737 B2 * | 11/2007 | Shima | ............................. | 361/31 |
| 7,453,220 B2 * | 11/2008 | Becker et al. | ................. | 318/362 |
| 2004/0026989 A1 * | 2/2004 | Suzuki et al. | ................... | 303/89 |
| 2006/0180365 A1 * | 8/2006 | Innami et al. | ................ | 180/65.5 |

FOREIGN PATENT DOCUMENTS

| | | |
|---|---|---|
| JP | 2175575 A | 7/1990 |
| JP | 06200963 A | 7/1994 |
| JP | 07328966 A | 12/1995 |
| JP | 2001278554 A | 10/2001 |
| JP | 2004314195 A | 11/2004 |
| JP | 2006304537 A | 11/2006 |

OTHER PUBLICATIONS

Notice of Reasons for Rejection for JP2006-314703 mailed May 27, 2008.

* cited by examiner

*Primary Examiner* — Walter Benson
*Assistant Examiner* — Antony M Paul
(74) *Attorney, Agent, or Firm* — Lowe, Hauptman, Ham & Berner, LLP (57) ABSTRACT

A motor driving apparatus for driving and braking a motor equipped with a brake comprises a motor/brake driving DC power supply which is used both as a motor driving power supply and as a brake driving power supply, wherein when the motor/brake driving DC power supply is being used as the motor driving power supply, a voltage conversion circuit via which a voltage supplied from the motor/brake driving DC power supply is applied to the brake feedback-controls the voltage applied to the brake. This configuration serves to reduce the loss (due to temperature rise) in the brake coil of the motor being driven to move a robot arm.

6 Claims, 7 Drawing Sheets

Fig.1

Prior Art

MOTOR DRIVING APPARATUS FOR DRIVING AND BRAKING BRAKE-EQUIPPED MOTOR

RELATED APPLICATIONS

The present application is based on, and claims priority from, Japanese Application Number 2006-314703, filed Nov. 21, 2006, the disclosure of which is hereby incorporated by reference herein in its entirety.

BACKGROUND OF THE INVENTION

1. Field of the Invention

The present invention relates to a motor driving apparatus for driving and braking a brake-equipped motor used in a machine tool, an industrial machine, a robot, or the like.

2. Description of the Related Art

Motor driving apparatus for driving and braking a brake-equipped motor used in a machine tool, an industrial machine, a robot, or the like include the type that has a DC power supply which is used both as a motor driving power supply and as a brake driving power supply.

Patent Document 1 discloses a brake control method for a robot in which, to prevent, for example, a robot arm from falling in the event of an emergency stop or power interruption, a brake is provided within a motor or on a rotating shaft that moves the robot arm, with provisions made to actuate the brake by de-energizing the brake coil upon occurrence of an emergency stop or power interruption.

Figure 1:
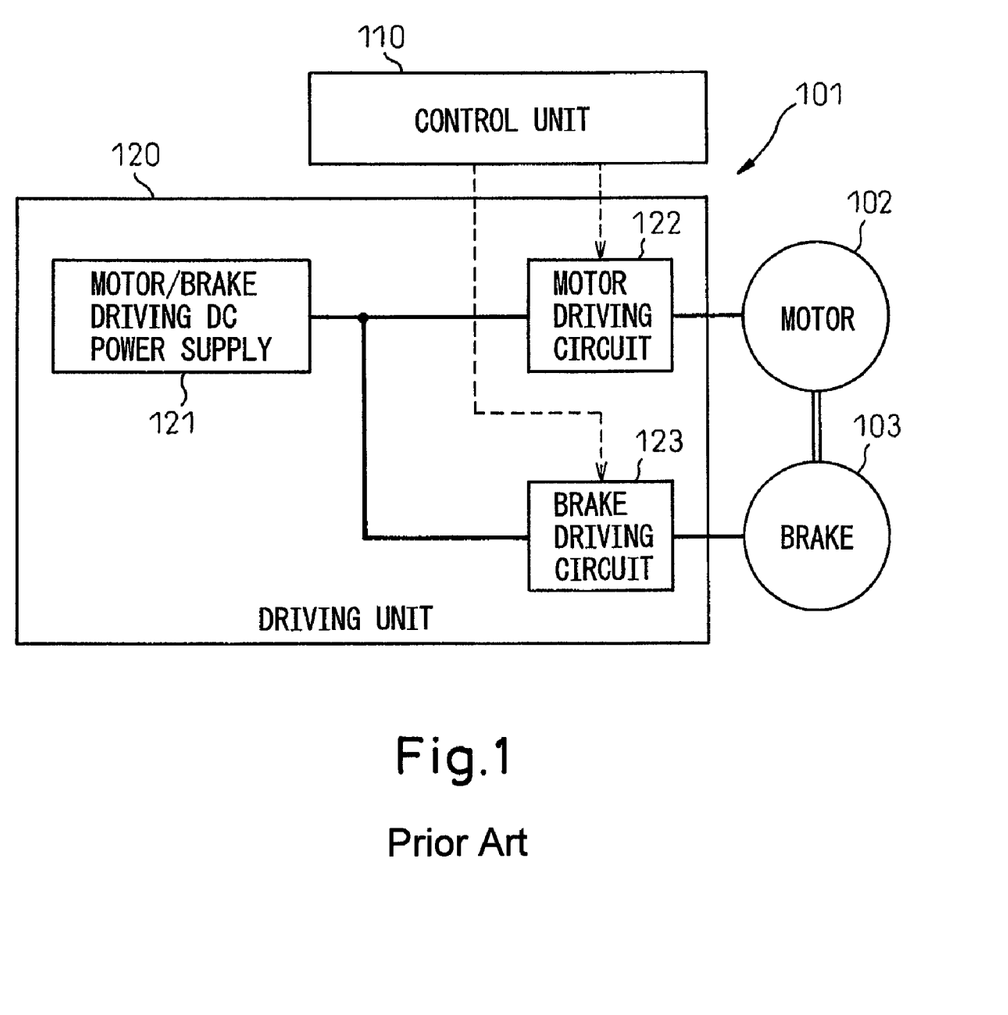
FIG. 1 is a block diagram showing the configuration of a motor driving apparatus according to the prior art.

FIG. 1 is a block diagram showing the configuration of a motor driving apparatus according to the prior art. Motor driving apparatus 101 is an apparatus for driving a motor 102 and for actuating a brake 103, and includes a control unit 110 and a driving unit 120. Control unit 110 supplies a speed command for motor 102 and a brake application command or brake release command for brake 103 to driving unit 120. Brake 103 is a power-off brake, and motor 102 can be braked by de-energizing the coil of brake 103. Driving unit 120 includes a motor/brake driving DC power supply 121 which is used both as a motor driving power supply and as a brake driving power supply, a motor driving circuit 122 which receives a speed command for motor 102 from control unit 110 and drives motor 102 at the commanded speed, and a brake driving circuit 123 which receives a brake application command or brake release command for brake 103 from control unit 110 and applies or releases brake 103 in accordance with the received command.

Patent Document 2 discloses an electromagnetic brake control apparatus which, when drawing a moving plate in an electromagnetic braking device by attraction (forceful energization state), performs control so that a large current is flown only during the drawing stroke that lasts briefly, and thereafter, the current flowing to the electromagnet of the electromagnetic brake is held at a relatively small level just sufficient to hold the moving plate in the attracted position (sustained energization state) by accurately controlling the energization current to the electromagnet at all times independently of the operating condition of the electromagnetic brake, that is, by properly controlling the energization current to the electromagnet of the electromagnetic brake so as to ensure high reliability and stable braking action while achieving sufficient energy saving. This electromagnetic brake control apparatus employs a method that controls the energization current to the electromagnetic brake actuating electromagnet through phase control by a thyristor from a commercial AC power supply, and detects the energization current supplied to the electromagnet of the electromagnetic brake and controls the firing angle of the thyristor in accordance with the deviation of the detected value from a reference value.

[Patent Document 1] Japanese Unexamined Patent Publication No. H07-328966 (see [CLAIM 1] of the claims, paragraph numbers [0002], [0007], [0011], and [0012] of the specification, and [FIG. 1] of the drawings) and Abstract of the Disclosure.

[Patent Document 2] Japanese Unexamined Patent Publication No. H06-200963 (see [CLAIM 1] of the claims, paragraph numbers [0002] to [0012], [0015] to [0017], [0051], and [0052] of the specification, and [FIG. 1] of the drawings) and Abstract of the Disclosure.

In the brake control method for a robot disclosed in Patent Document 1, the motor/brake driving DC power supply is used for driving the brake as well as for driving the motor, but in this case, because of the fluctuation in supply voltage during the driving of the motor, in particular, the fluctuation in supply voltage associated with the acceleration and deceleration of the motor, the voltage applied to the brake coil as the brake driving power becomes unstable, and in the worst case, the brake coil may be damaged.

In the electromagnetic brake control apparatus disclosed in Patent Document 2, while improvements can be achieved in terms of the stability of braking action and the reduction of energy consumption, reducing the time required to release the brake or effect the braking is not considered.

SUMMARY OF THE INVENTION

The present invention has been devised to solve the above problems, and an object of the invention is to provide a motor driving apparatus wherein provisions are made to suppress the fluctuation in supply voltage that occurs during the driving of the motor due to the use of the motor/brake driving DC power supply for driving the brake as well as for driving the motor, to stabilize the braking action, to prevent the deterioration of the brake coil, and to reduce the time required to release the brake as well as the time required to effect the braking.

A motor driving apparatus according to claim 1, which accomplishes the above object, is a motor driving apparatus for driving and braking a motor equipped with a brake, comprising a motor/brake driving DC power supply which is used both as a motor driving power supply and as a brake driving power supply, wherein when the motor/brake driving DC power supply is being used as the motor driving power supply, a voltage conversion circuit via which a voltage supplied from the motor/brake driving DC power supply is applied to the brake feedback-controls the voltage applied to the brake.

In the above motor driving apparatus, when the motor/brake driving DC power supply is being used as the motor driving power supply, the voltage conversion circuit increases the voltage applied to the brake for a predetermined period immediately after the brake is released, and reduces the applied voltage when holding the brake in a released condition after the predetermined period has elapsed.

In the above motor driving apparatus, the voltage conversion circuit performs voltage control by pulse width modulation PWM.

DETAILED DESCRIPTION

The embodiments of the present invention will be described in detail below with reference to the accompanying drawings.

Figure 2A:
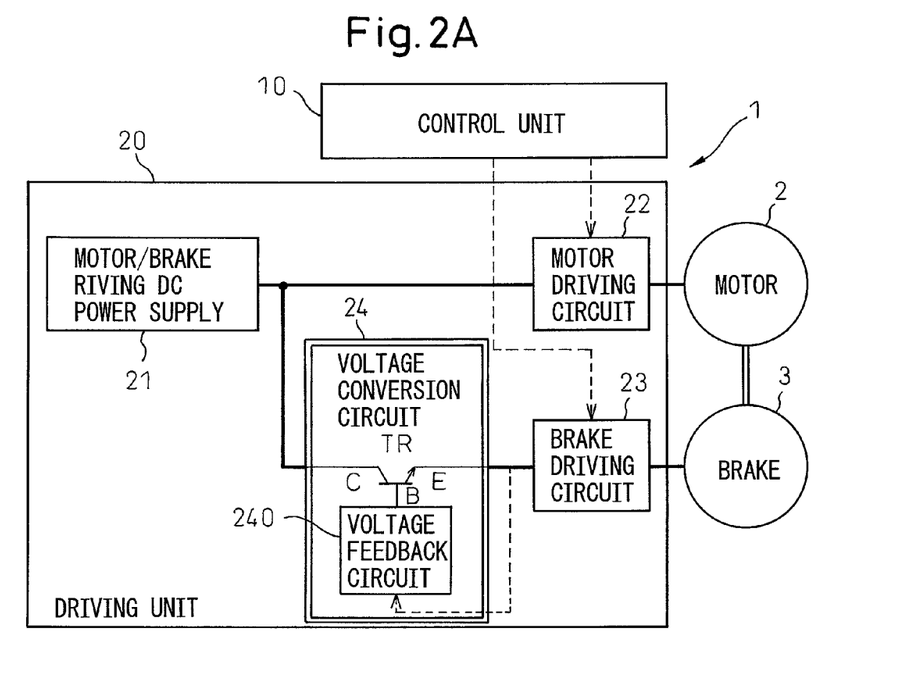
FIG. 2A is a block diagram showing the configuration of a motor driving apparatus according to a first embodiment of the present invention.
Figure 2B:
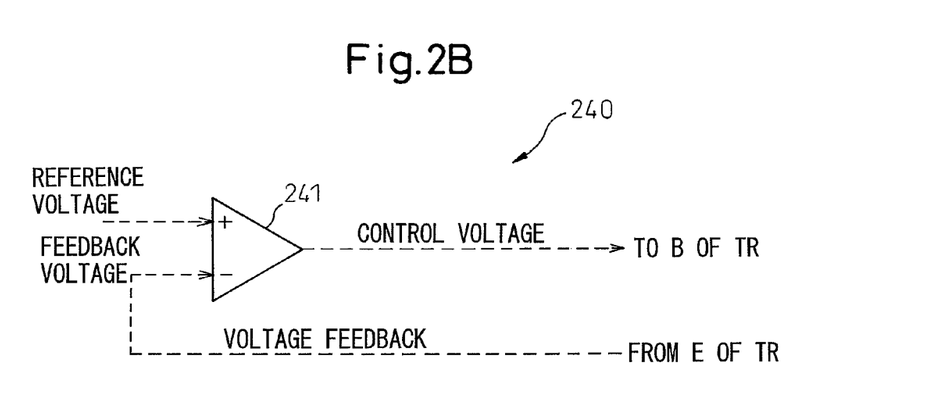
FIG. 2B is a diagram schematically showing a voltage feedback circuit shown in FIG. 2A.

FIG. 2A is a block diagram showing the configuration of a motor driving apparatus according to a first embodiment of the present invention, and FIG. 2B is a diagram schematically showing a voltage feedback circuit shown in FIG. 2A.

The motor driving apparatus 1 shown in FIG. 2A is an apparatus for driving a motor 2 and for actuating a brake 3, and includes a control unit 10 and a driving unit 20. Control unit 10 supplies a speed command for motor 2 and a brake application command or brake release command for brake 3 to driving unit 20. Brake 3 is a power-off brake, and motor 2 can be braked by de-energizing the coil of brake 3. Driving unit 20 includes a motor/brake driving DC power supply 21 which is used both as a motor driving power supply and as a brake driving power supply, a motor driving circuit 22 which receives a speed command for motor 2 from control unit 10 and drives motor 2 at the commanded speed, a brake driving circuit 23 which receives a brake application command or brake release command for brake 3 from control unit 10 and applies or releases brake 3 in accordance with the received command, and a voltage conversion circuit 24 for maintaining the voltage applied to brake 3 at a constant level during the period that the brake is disengaged from motor 2 by energizing the coil of brake 3.

Motor/brake driving DC power supply 21 is a power supply that is fed from an external three-phase power supply and that produces a DC voltage by AC/DC conversion. Motor driving circuit 22 receives a speed command for motor 2 from control unit 10, performs DC/AC conversion, and drives motor 2 by PWM control in accordance with the speed command. Brake driving circuit 23 receives DC power from motor/brake driving DC power supply 21, and applies the DC voltage directly to the coil of brake 3 in accordance with a brake application command or brake release command for brake 3 received from control unit 10.

As shown in FIG. 2A, voltage conversion circuit 24 comprises a power transistor TR and voltage feedback circuit 240. In the voltage conversion circuit 24, the input from motor/brake driving DC power supply 21 is received at the collector C of the power transistor TR, and voltage feedback circuit 240 controls the current flowing to the base B of the TR so that a constant voltage is output from the emitter E of the TR to brake driving circuit 23. The voltage applied to brake 3 is thus controlled at a constant level by voltage conversion circuit 24.

In voltage feedback circuit 240 whose general configuration is shown in FIG. 2B, an internally generated reference voltage is compared with a feedback voltage which represents the voltage supplied to the brake driving circuit 23, and a control voltage for controlling the base current of the power transistor TR in voltage conversion circuit 24 is obtained at the output of a differential amplifier 241 as a result of the comparison between the two voltages; voltage feedback circuit 240 then supplies the control voltage to the base B of the power transistor TR, thereby controlling the voltage supplied to brake driving circuit 23 at a constant level.

According to the motor driving apparatus 1 according to the first embodiment described above, if the output voltage of motor/brake driving DC power supply 21 fluctuates during the driving of motor 2, the voltage applied to brake 3 can be maintained constant by voltage conversion circuit 24 which controls the input voltage to brake driving circuit 23 at a constant level. Since the voltage applied to brake 3 can be varied by voltage conversion circuit 24 irrespective of the supply voltage specification of brake 3, it becomes possible to use the motor/brake driving DC power supply for driving the brake as well as for driving the motor.

Figure 3:
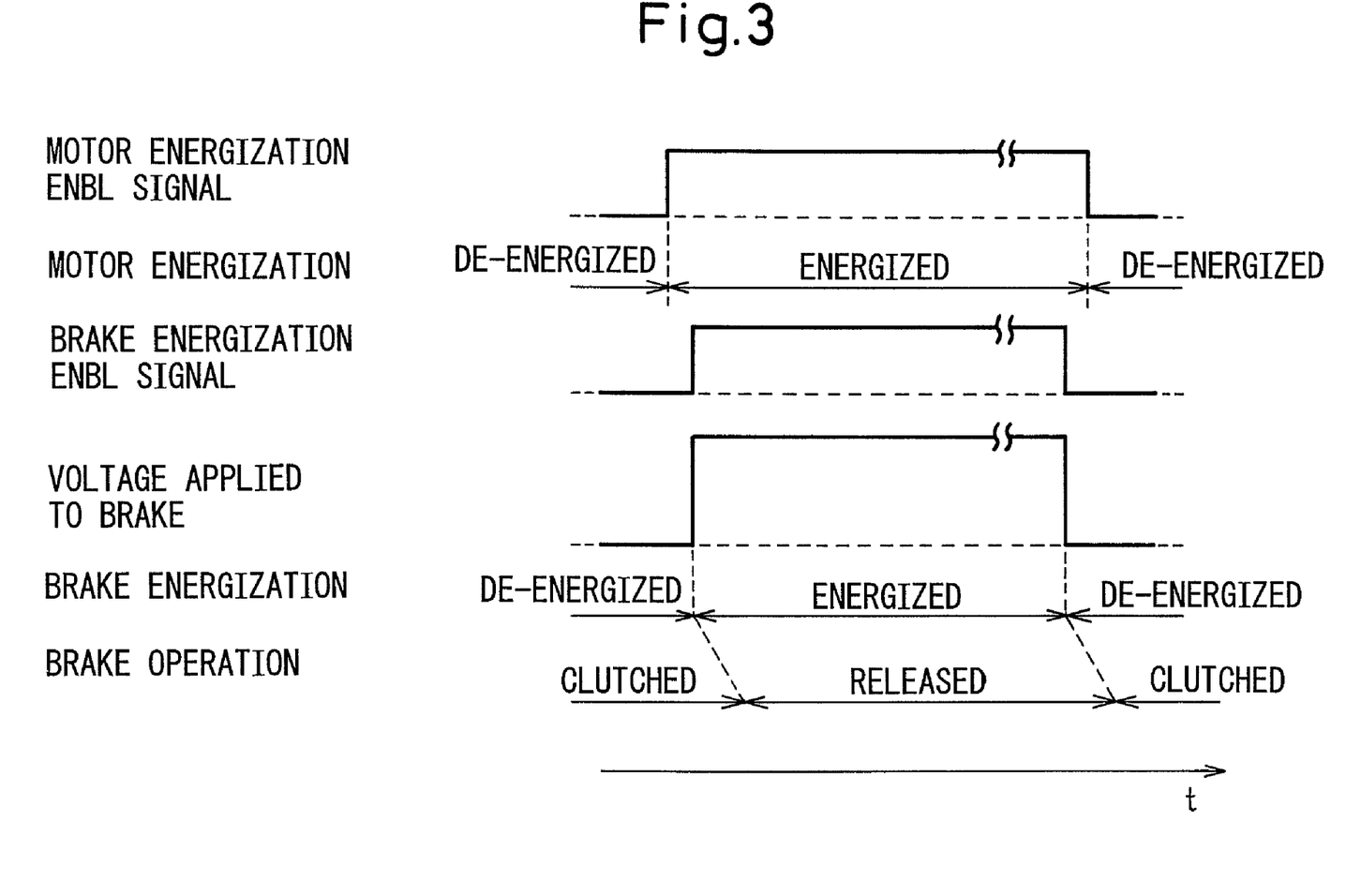
FIG. 3 is a flowchart showing the operation of the motor driving apparatus according to the first embodiment of the present invention shown in FIGS. 2A and 2B.

FIG. 3 is a flowchart showing the operation of the motor driving apparatus according to the first embodiment of the present invention shown in FIG. 2. The horizontal axis represents the time t. When driving motor 2, control unit 10 supplies a motor energization enable ENBL signal to motor driving circuit 22. When the motor energization enable ENBL signal is input, motor 2 is immediately energized and, after a finite time delay from the input of the motor energization enable ENBL signal, a brake energization enable ENBL signal to brake driving circuit 23 is input from control unit 10 to brake driving circuit 23. When the brake energization enable ENBL signal is input, brake 3 is immediately energized and, after a predetermined period of time, the brake switches from the brake applied (clutched) condition to the brake released condition.

When stopping motor 2, the brake energization enable ENBL signal being supplied from control unit 10 to brake driving circuit 23 is set from ON to OFF and, after a predetermined period of time, the brake switches from the brake released condition to the brake applied (clutched) condition. After a finite time delay from the ON-to-OFF switching of the brake energization enable ENBL signal, the motor energization enable ENBL signal being supplied from control unit 10 to motor driving circuit 22 is set from ON to OFF which is input to motor driving circuit 22. When the motor energization enable ENBL signal becomes OFF, motor 2 is immediately de-energized and thus stops.

The reason for introducing the finite time delay during which the motor energized state overlaps the brake de-energized state is that, in the case of a robot arm, for example, if the energization of the motor is started or stopped at the same time that the brake is de-energized, the robot arm may fall of its own weight. For a load that will not fall of its own weight, there is no need introduce such a finite time delay.

Figure 4:
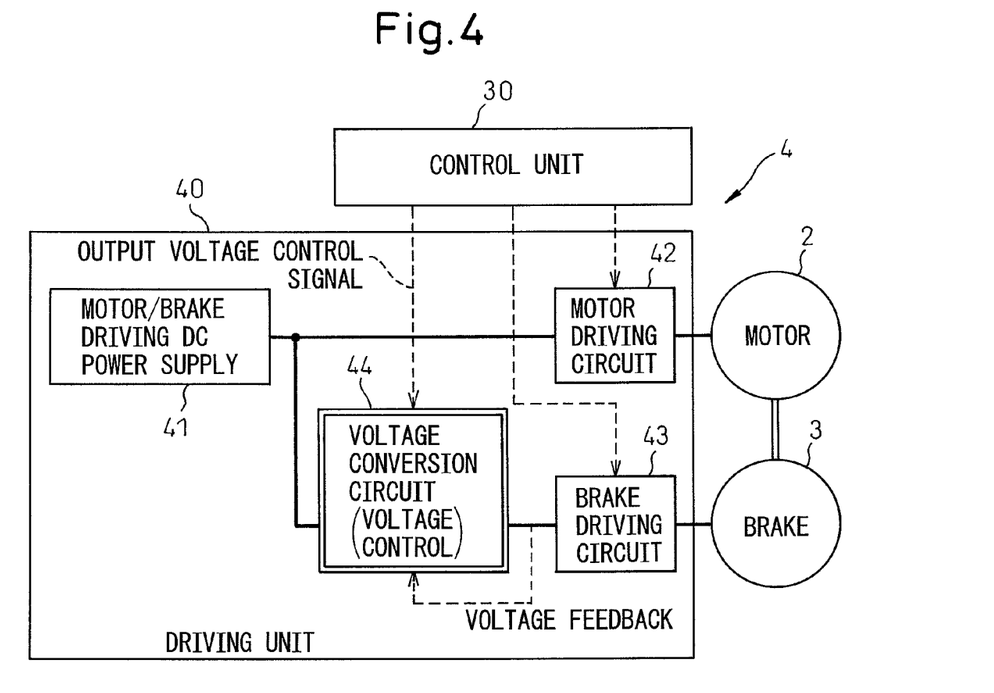
FIG. 4 is a block diagram showing the configuration of a motor driving apparatus according to a second embodiment of the present invention.

FIG. 4 is a block diagram showing the configuration of a motor driving apparatus according to a second embodiment of the present invention. Motor driving apparatus 4 shown in FIG. 4 is substantially the same as the motor driving apparatus 1 shown in FIG. 2A, except that a voltage conversion circuit 44 is different and that a control signal is supplied from control unit 30 to voltage conversion circuit 44. That is, control unit 30, driving unit 40, motor/brake driving DC power supply 41, motor driving circuit 42, and brake driving circuit 43 shown in FIG. 4 are substantially the same as control unit 10, driving unit 20, motor/brake driving DC power supply 21, motor driving circuit 22, and brake driving circuit 23, respectively, shown in FIG. 2.

Voltage conversion circuit 44 shown in FIG. 4 is configured to control the input voltage to brake driving circuit 43 so that, when driving motor 2, a sufficiently high voltage is output in order to reduce the time required to release brake 3 but, after a predetermined period of time has elapsed from the start of the driving of motor 2, the voltage is held at a reduced level in order to minimize the deterioration of the coil of brake 3.

Figure 5:
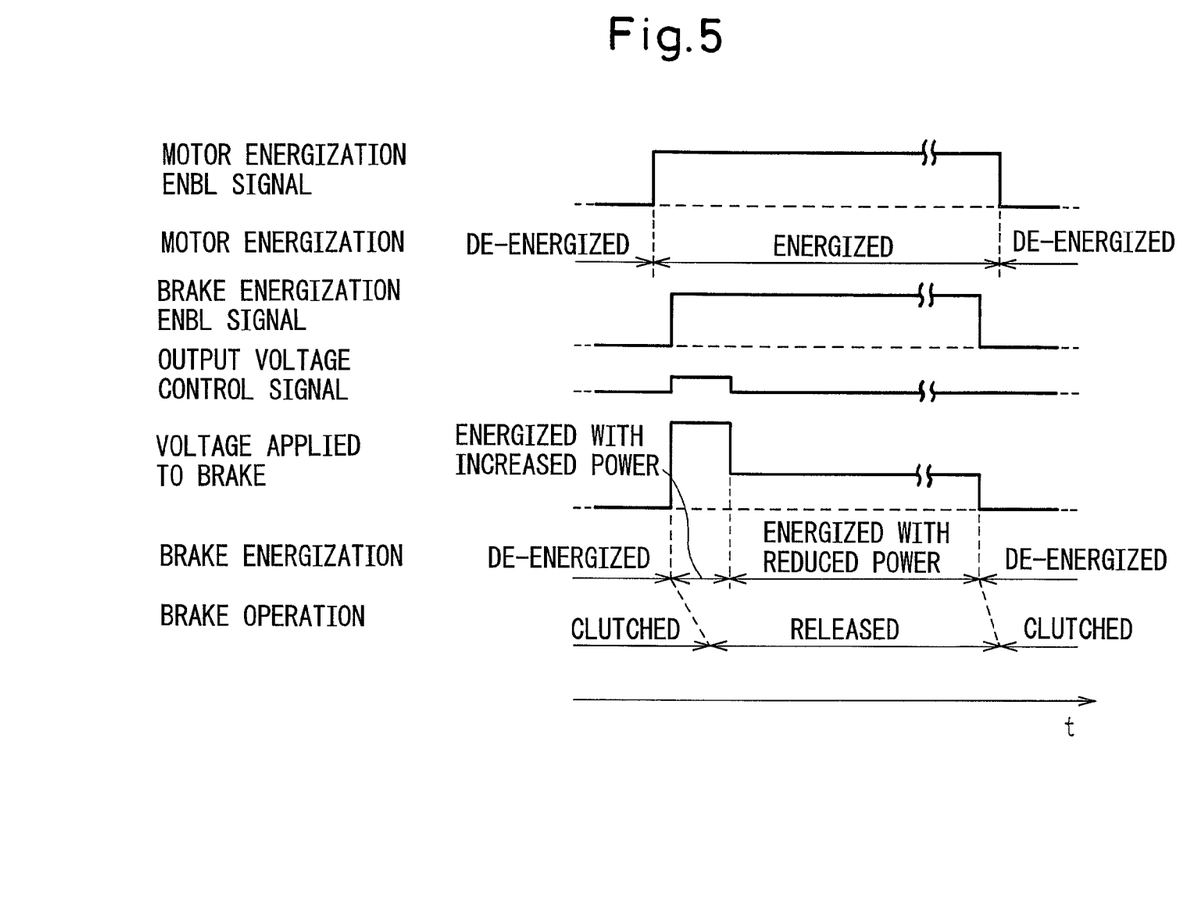
FIG. 5 is a flowchart showing the operation of the motor driving apparatus according to the second embodiment of the present invention shown in FIG. 4.

FIG. 5 is a flowchart showing the operation of the motor driving apparatus according to the second embodiment of the present invention shown in FIG. 4. The horizontal axis represents the time t. When driving motor 2, control unit 30 supplies a motor energization enable ENBL signal to motor driving circuit 42. When the motor energization enable ENBL signal is input, motor 2 is immediately energized, and after a finite time delay from the input of the motor energization enable ENBL signal, a brake energization enable ENBL signal to brake driving circuit 43 is input from control unit 30 to brake driving circuit 43. When the brake energization enable ENBL signal is input, brake 3 is immediately energized and, after a predetermined period of time, the brake switches from the brake applied (clutched) condition to the brake released condition.

When stopping motor 2, the brake energization enable ENBL signal being supplied from control unit 30 to brake driving circuit 43 is set from ON to OFF and, after a predetermined period of time, the brake switches from the brake released condition to the brake applied (clutched) condition. After a finite time delay from the ON-to-OFF switching of the brake energization enable ENBL signal, the motor energization enable ENBL signal being supplied from control unit 30 to motor driving circuit 42 is set from ON to OFF which is input to motor driving circuit 42. When the motor energization enable ENBL signal becomes OFF, motor 2 is immediately de-energized and thus stops.

At the same time that the brake energization enable ENBL signal is input from control unit 30 to brake driving circuit 43, an output voltage control signal is input from control unit 30 to voltage conversion circuit 44 and held in that state for a predetermined period. Voltage conversion circuit 44 supplies a voltage to brake driving circuit 43 only during the period that the brake energization enable ENBL signal is being input. Voltage conversion circuit 44 performs control so that a higher voltage is supplied to brake driving circuit 43 for a predetermined period after the output voltage control signal is input to voltage conversion circuit 44 than when the output voltage control signal is not input. When the output voltage control signal ceases to be input, voltage conversion circuit 44 performs control so that a lower voltage is supplied to brake driving circuit 43 than when the output voltage control signal is being input. By thus controlling the voltage supplied from voltage conversion circuit 44 to brake driving circuit 43, the operating time of brake 3 can be reduced.

Figure 6A:
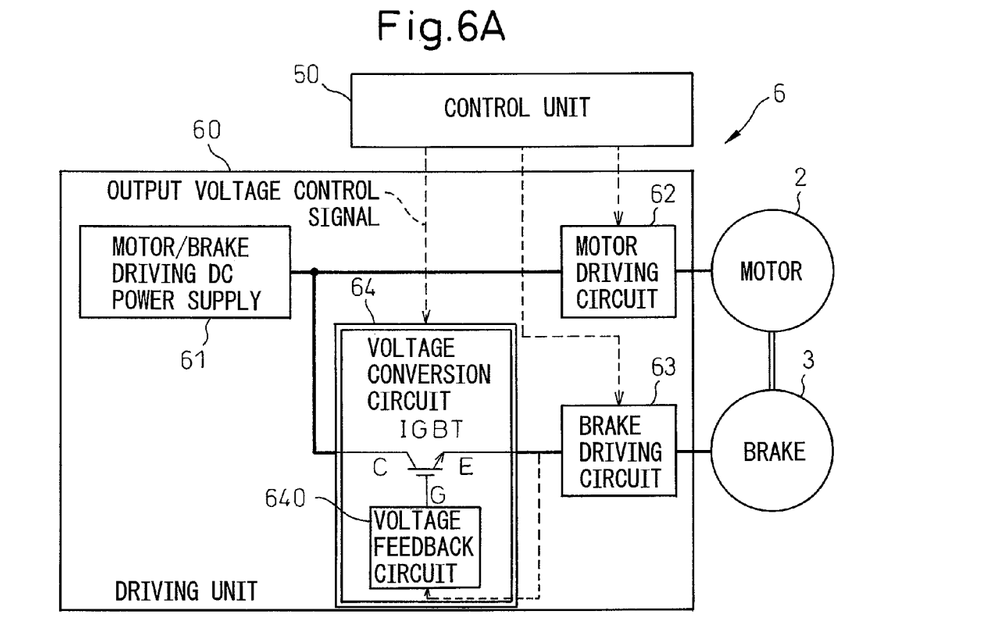
FIG. 6A is a block diagram showing the configuration of a motor driving apparatus according to a third embodiment of the present invention.
Figure 6B:
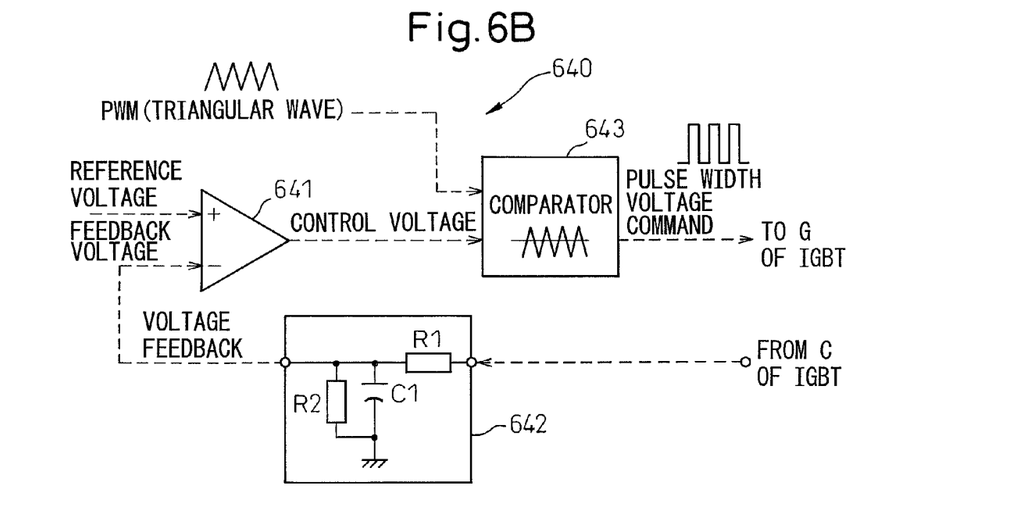
FIG. 6B is a diagram schematically showing a voltage feedback circuit shown in FIG. 6A.

FIGS. 6A and 6B are block diagrams showing the configuration of a motor driving apparatus according to a third embodiment of the present invention, and FIG. 6B is a diagram schematically showing a voltage feedback circuit shown in FIG. 2A. Motor driving apparatus 6 shown in FIGS. 6A and 6B is substantially the same as the motor driving apparatus 1 shown in FIG. 2A, except that a voltage conversion circuit 64 is different and that an output voltage control signal is supplied from a control unit 50 to voltage conversion circuit 64 in the motor driving apparatus 6. That is, control unit 50, driving unit 60, motor/brake driving DC power supply 61, motor driving circuit 62, and brake driving circuit 63 shown in FIG. 6 are substantially the same as control unit 10, driving unit 20, motor/brake driving DC power supply 21, motor driving circuit 22, and brake driving circuit 23, respectively, shown in FIG. 2A.

Voltage conversion circuit 64 shown in FIG. 6A is configured to control the input voltage to brake driving circuit 63 so that, when driving motor 2, a sufficiently high voltage is output in order to reduce the time required to release brake 3 but, after a predetermined time has elapsed from the start of the driving of motor 2, the voltage is held at a reduced level in order to minimize the deterioration of the coil of brake 3.

As shown in FIG. 6A, voltage conversion circuit 64 comprises an IGBT and a voltage feedback circuit 640. In voltage conversion circuit 64, the input from motor/brake driving DC power supply 61 is received at the collector C of the IGBT, and a pulse voltage proportional to the pulse signal applied to the gate G of the IGBT is output from the emitter E of the IGBT to brake driving circuit 63. The pulse signal applied to the gate G of the IGBT is controlled by voltage feedback circuit 640.

In voltage feedback circuit 640 whose general configuration is shown in FIG. 6B, an internally generated reference voltage is compared with a feedback voltage, i.e., an output voltage from a CR circuit 642 which receives the voltage supplied to brake driving circuit 63 (the voltage output from the emitter E of the IGBT) and which outputs a voltage proportional to the duty cycle of the pulse, a control voltage output from a differential amplifier 641 as a result of the comparison between the two voltages is compared in a comparator 643 with an internally generated PWM control triangular wave, and the result of the comparison, output as a pulse width voltage command, is applied to the gate G of the IGBT, thereby controlling the voltage supplied to brake driving circuit 63. CR circuit 642 is a circuit that charges with the time constant C1R1 of a resistor R2 and capacitor C1 and discharges electrical energy stored on the capacitor C1 through a resistor R2; a high-frequency pulse is input to this circuit, and a voltage proportion to the duty cycle of the pulse is output.

Figure 7:
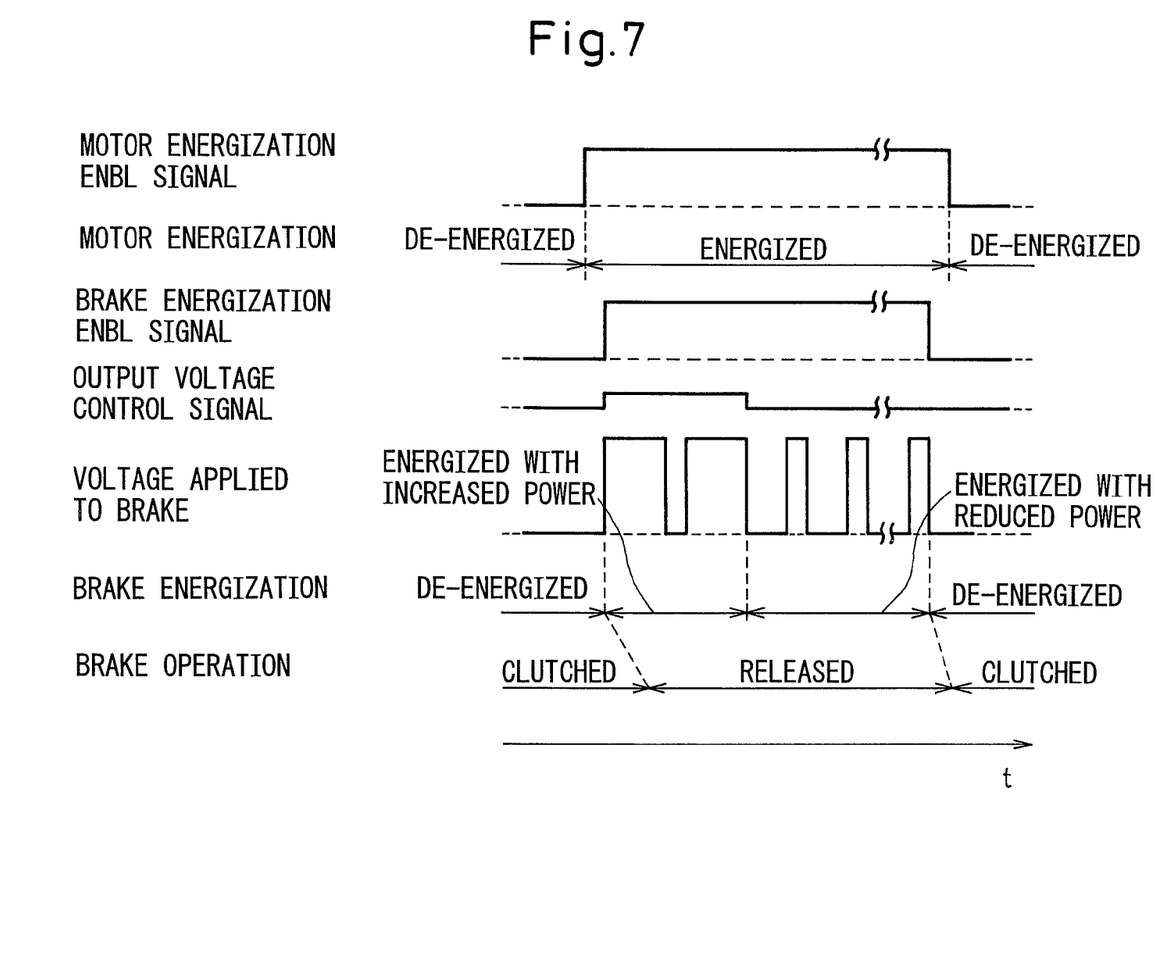
FIG. 7 is a flowchart showing the operation of the motor driving apparatus according to the third embodiment of the present invention shown in FIGS. 6A and 6B.

FIG. 7 is a flowchart showing the operation of the motor driving apparatus according to the third embodiment of the present invention shown in FIGS. 6A and 6B. The horizontal axis represents the time t. When driving motor 2, control unit 50 supplies a motor energization enable ENBL signal to motor driving circuit 62. When the motor energization enable ENBL signal is input, motor 2 is immediately energized, and after a finite time delay from the input of the motor energization enable ENBL signal, a brake energization enable ENBL signal to brake driving circuit 63 is input from control unit 50 to brake driving circuit 63. When the brake energization enable ENBL signal is input, brake 3 is immediately energized, and after a predetermined period of time, the brake switches from the brake applied (clutched) condition to the brake released condition.

When stopping motor 2, the brake energization enable ENBL signal being supplied from control unit 50 to brake driving circuit 63 is set from ON to OFF, and after a predetermined period of time, the brake switches from the brake released condition to the brake applied (clutched) condition. After a finite time delay from the ON-to-OFF switching of the brake energization enable ENBL signal, the motor energization enable ENBL signal being supplied from control unit 50 to motor driving circuit 62 is set from ON to OFF which is input to motor driving circuit 62. When the motor energization enable ENBL signal becomes OFF, motor 2 is immediately de-energized and thus stops.

At the same time that the brake energization enable ENBL signal is input from control unit 50 to brake driving circuit 63, an output voltage control signal is input from control unit 50 to voltage conversion circuit 64 and held in that state for a predetermined period. Voltage conversion circuit 64 supplies a voltage to brake driving circuit 63 only during the period that the brake energization enable ENBL signal is being input. Voltage conversion circuit 64 performs control so that a pulse voltage with a higher duty cycle is supplied to brake driving circuit 63 for a predetermined period after the output voltage control signal is input to voltage conversion circuit 64 than when the output voltage control signal is not input. When the output voltage control signal ceases to be input, voltage conversion circuit 64 performs control so that a pulse voltage with a lower duty cycle is supplied to brake driving circuit 63 than when the output voltage control signal is being input. By thus controlling the duty cycle of the pulse voltage supplied from voltage conversion circuit 64 to brake driving circuit 63, the operating time of brake 3 can be reduced.

According to the invention described in claim 1, because of the provision of the voltage conversion circuit which controls the brake driving voltage by means of feedback, if motor driving power fluctuates, stable brake driving power can be supplied to the brake, stabilizing the voltage applied to the brake coil and thus serving to suppress loss in the brake coil.

Furthermore, with the provision of the voltage conversion circuit, a single power supply can be used both as the motor driving power supply and as the brake driving power supply.

According to the invention described in claim 2, by increasing the applied voltage when releasing the brake from the actuated condition, the time required to release the brake can be reduced, and by reducing the applied voltage when holding the brake in the released condition, the time required to effect the braking (to hold the brake in a clutched condition) can be reduced.

Furthermore, by reducing the voltage when holding the brake, the loss in the brake coil can be reduced, which serves to reduce the size of the brake.

According to the invention described in claim 3, since the output voltage of the voltage conversion circuit can be precisely adjusted, the loss in the brake coil can be further reduced.

What is claimed is:

1. A motor driving apparatus for a drive motor equipped with a power-off brake, said apparatus comprising:
    a brake driving circuit for supplying a brake-release voltage to a power-off brake;
    a voltage conversion circuit; and
    a control unit for supplying control signals to the brake driving circuit and the voltage conversion circuit;
    wherein the voltage conversion circuit is configured to generate:
        a first voltage for inputting to the brake driving circuit, the first voltage generated for a predetermined period after a start of supplying a voltage to the drive motor; and
        a second voltage for inputting to the brake driving circuit, the second voltage lower that the first voltage, for holding said power-off brake in a released condition after the predetermined period.

2. A motor driving apparatus as claimed in claim 1, wherein said voltage conversion circuit is configured to control said brake-release voltage applied to the power-off brake by pulse width modulation (PWM).

3. A motor driving apparatus, as claimed in claim 2, wherein the voltage conversion unit includes:
    an insulated gate bipolar transistor (IGBT); and
    a voltage feedback circuit;
    wherein the collector of the IGBT is connected to a DC power supply, the emitter of the IGBT is connected to the brake driving circuit, and the voltage feedback circuit is connected between the emitter and the gate of the IGBT, the voltage feedback circuit configured to generate a pulse voltage, proportional to a pulse signal applied to the gate, from the emitter of the IGBT.

4. A motor driving apparatus, as claimed in claim 3, wherein the voltage feedback circuit includes:
    a capacitor resistor circuit for generating an output based on the output of the emitter and outputting a voltage proportional to the duty cycle of the output of the emitter;
    a differential amplifier having a control voltage output based upon a comparison of the output of the capacitor resistor circuit and a reference voltage; and
    a comparator for comparing the control voltage output of the differential amplifier and an internally generated pulse width modulation control triangular wave, the comparator having a pulse width voltage command output to the gate of the IGBT.

5. A motor driving apparatus, as claimed in claim 1, wherein said power-off brake further includes a coil, wherein the motor is configured to be braked by de-energizing the coil.

6. A motor driving apparatus for a drive motor equipped with a power-off brake, said apparatus comprising:
    a brake driving circuit for supplying a brake-release voltage to a power-off brake;
    a voltage conversion circuit for applying a voltage to the brake driving circuit; and
    a control unit for releasing the power-off brake, the control unit configured to generate:
        an output voltage control signal to the voltage conversion circuit, and
        a brake energization enable signal to the brake driving circuit,
    wherein while the brake energization enable signal is outputted, the voltage conversion circuit and brake driving circuit are configured to generate the brake release voltage having:
        a pulse voltage with a first duty cycle during a predetermined period while the output voltage control signal is input to the voltage conversion circuit; and
        a pulse voltage with a second duty cycle lower than the first duty cycle when the output voltage control signal ceases.

* * * * *